(No Model.)
J. O. FORD.
TRUNK CATCH.
No. 312,195. Patented Feb. 10, 1885.
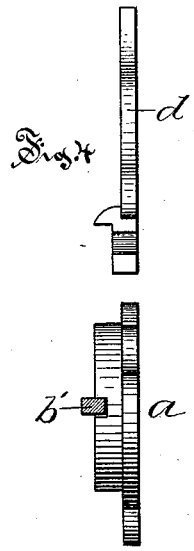
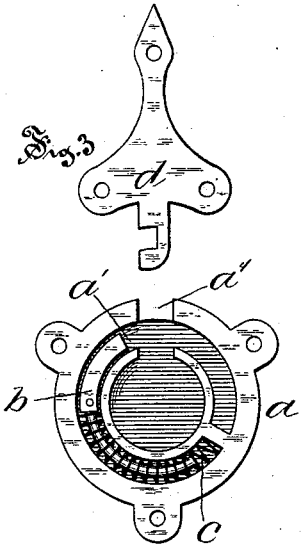
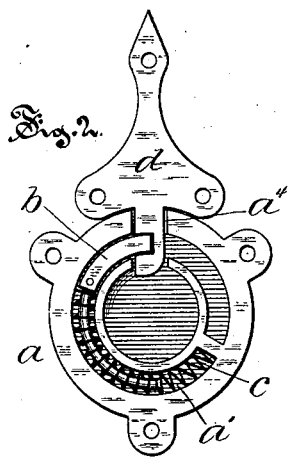
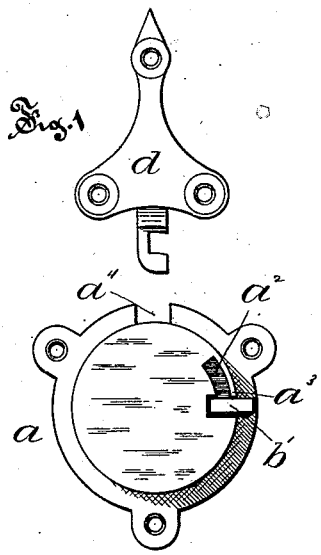
Witnesses
W. M. Bjerkmans.
Ed. F. Dimock.
Inventor
Jarvis O. Ford,
By Simonds & Burdett,
Attys.

UNITED STATES PATENT OFFICE.

JARVIS O. FORD, OF HARTFORD, CONNECTICUT, ASSIGNOR OF ONE-HALF TO FRANKLIN R. SLOCUM, OF SAME PLACE.

TRUNK-CATCH.

SPECIFICATION forming part of Letters Patent No. 312,195, dated February 10, 1885.

Application filed June 6, 1884. (No model.)

*To all whom it may concern:*

Be it known that I, JARVIS O. FORD, of Hartford, in the county of Hartford and State of Connecticut, have invented certain new and useful Improvements in Trunk-Catches, of which the following is a full, clear, and exact description, whereby a person skilled in the art can make and use the same, reference being had to the accompanying drawings, and to the letters of reference marked thereon, where—

Figure 1 is a front view of my device. Fig. 2 is a rear view of same. Fig. 3 is a rear view of the catch, showing the bolt withdrawn. Fig. 4 is an edge view of same with part broken away to show construction.

My invention relates to the class of catches used on trunks and similar articles, the catch being made up of a bolt-bearing case usually attached to the body of a trunk, and a hook-bearing part commonly attached to the trunk-lid.

It consists in the combination of the bolt-case with the inclosed curved bolt and a mortise or slot in the edge of the case, through which the hook or hasp is thrust in order to lock the device, the parts having also certain other details of construction and arrangement, as more particularly hereinafter described.

In the accompanying drawings, the letter $a$ denotes a bolt-case, preferably of metal cast to shape, and having in the case an annular bolt-socket, $a'$, that opens to the back of the case; $b$, a curved bolt arranged to move in the socket; $c$, a spiral spring arranged about the stem of the bolt and thrusting against a seat in the socket and a shoulder on the bolt; $a^2$, a slot in the front of the case having a locking-shoulder, $a^3$; $b'$, an arm attached to the bolt $b$ and extending through the slot in the case.

When the bolt-case is attached in place for use, as by means of nails or screws passing through holes in the case, the bolt $b$ may be operated to engage or disengage the socket in the lower end of the hook $d$ that enters the case through the mortise $a^4$. The hook is provided with openings, through which nails or screws may be driven, to attach it to the lid of the trunk.

The operation of my device is as follows: The bolt case and hook being attached to the body and lid of a trunk, respectively, in such manner that the projecting end of the hook may enter the socket in the bolt-case, the catch is made operative to hold the parts together by sliding the bolt $b$ into the socket in the hook. The hook is released by withdrawing the bolt by means of the projecting arm, so that the trunk-lid may be raised, and the bolt may, if desired, be locked back by causing the arm to engage the locking-shoulder $a^3$. It may be locked at the forward limit of its play by engaging the arm in a similar socket, if desired, or the thrust of the spring upon the bolt is usually sufficient to prevent such accidental displacement of the bolt as will release the hook.

I claim as my invention—

In combination, the bolt-case $a$, having a curved bolt-socket, $a'$, a slot, $a^2$, with a locking-shoulder, $a^3$, and a lateral mortise, $a^4$, across the path of the bolt, a curved bolt, $b$, operating within the case, a spring, $c$, for actuating the same, said bolt $b$ bearing an arm projecting through the slot $a^2$, and the hook or hasp $d$, all substantially as described.

JARVIS O. FORD.

Witnesses:
CHAS. L. BURDETT,
H. R. WILLIAMS.